United States Patent [19]

Morita

[11] 3,971,212

[45] July 27, 1976

[54] METHOD OF AND AN APPARATUS FOR PURIFYING EXHAUST GASES OF AN INTERNAL COMBUSTION ENGINE

[75] Inventor: Minoru Morita, Nagoya, Japan

[73] Assignee: Toyota Jidosha Kogyo Kabushiki Kaisha, Toyota, Japan

[22] Filed: May 20, 1974

[21] Appl. No.: 471,829

[30] Foreign Application Priority Data

Feb. 7, 1974 Japan.............................. 49-15763

[52] U.S. Cl..................................... 60/290; 60/306
[51] Int. Cl.²...................... F02B 75/10; F01N 3/10
[58] Field of Search ............. 60/289, 290, 306, 274, 60/302

[56] References Cited
UNITED STATES PATENTS

| | | | |
|---|---|---|---|
| 3,413,803 | 12/1968 | Rosenlund | 60/306 |
| 3,438,198 | 4/1969 | Bentele | 60/306 |
| 3,733,829 | 5/1973 | Henault | 60/289 |
| 3,788,070 | 1/1974 | Camarasa | 60/290 |
| 3,808,806 | 5/1974 | Nakamura | 60/302 |
| 3,812,673 | 5/1974 | Muroki | 60/290 |
| 3,826,089 | 7/1974 | Nakajima | 60/290 |

FOREIGN PATENTS OR APPLICATIONS 20,604 10/1971 Japan.................................. 60/304

*Primary Examiner*—Douglas Hart
*Attorney, Agent, or Firm*—Stewart and Kolasch, Ltd.

[57] ABSTRACT

A method of purifying exhaust gases of an internal combustion engine by a manifold reactor, wherein secondary air is dividedly supplied at first and second stages especially in a cold starting or accelerating condition of the engine, to burn combustible components in a stepwise manner while avoiding too much cooling of the exhaust gases before the recombustion of the combustible components takes place. This method is effected by a two-staged secondary air supply port structure operated by a control system which responds to operational conditions of the engine.

3 Claims, 5 Drawing Figures

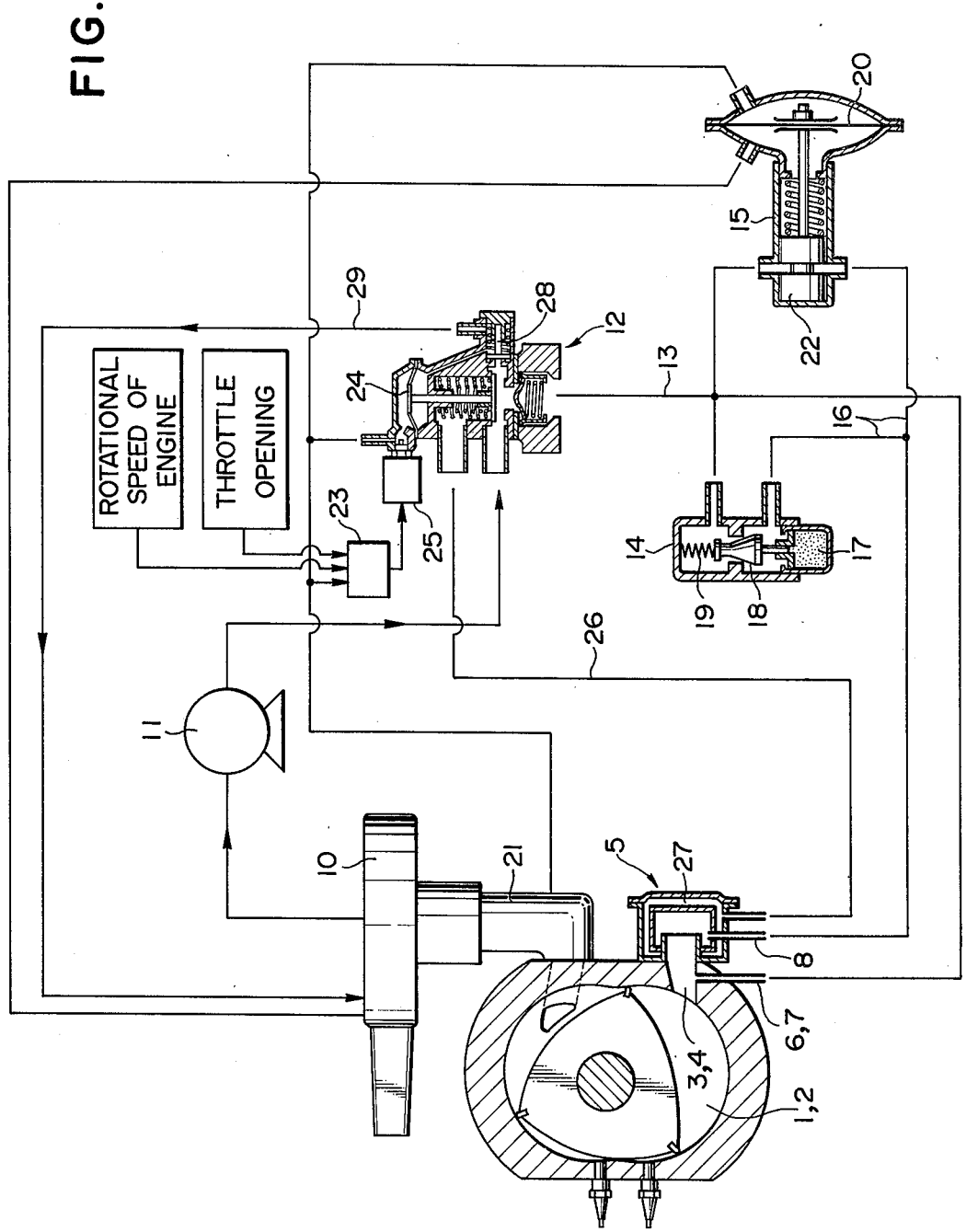

METHOD OF AND AN APPARATUS FOR PURIFYING EXHAUST GASES OF AN INTERNAL COMBUSTION ENGINE

BACKGROUND OF THE INVENTION

1. Field of the Invention

The present invention relates to a method of and an apparatus for purifying exhaust gases of an internal combustion engine by employing a manifold reactor.

2. Description of the Prior Art

In an internal combustion engine, particularly a rotary piston engine, the exhaust gases of the engine are usually introduced into a manifold reactor provided in connection with exhaust ports of the engine, wherein secondary air is supplied to the exhaust gases to burn combustible gases such as CO, HC, etc, contained in the exhaust gases in the manifold reactor to effect purification of the exhaust gases. In this case, the secondary air is conventionally supplied to the exhaust gases delivered from the combustion chambers of the engine before they enter into the manifold reactor so that the combustible components contained in the exhaust gases have sufficient contact with oxygen supplemented with the secondary air for a time sufficient to accomplish perfect combustion of the combustible components while the exhaust gases flow through the manifold reactor. This conventional system of supplying the secondary air operates satisfactorily to accomplish the purification of the exhaust gases when the engine is in normal condition after the engine has been warmed up. However, in the cold starting up condition wherein the temperature of the exhaust gases has not yet been sufficiently raised and the manifold reactor is still relatively cold, if all of a predetermined amount of the secondary air has been supplied or ejected at a time into the exhaust gases delivered from the exhaust port, the temperature of the exhaust gases is lowered so far that perfect combustion of the combustible components is impeded and the performance of purifying the exhaust gas is deteriorated. Furthermore, even after the engine has been warmed up, the temperature of the exhaust gases substantially lowers when the engine is accelerated when compared with the normal operating condition and, accordingly, it causes an abrupt lowering of the exhaust gas temperature when all of the secondary air is supplied at one time to the exhaust gases delivered from the exhaust ports, resulting in prohibiting the perfect combustion of the exhaust gases.

SUMMARY OF THE INVENTION

Therefore, it is the object of the present invention to counteract the aforementioned problems and to accomplish the perfect combustion of the combustible components contained in the exhaust gases in the manifold reactor by supplying the secondary air to the exhaust gases dividedly as a first stage secondary air which is added to the exhaust gases before they enter into the exhaust manifold and a second stage secondary air which is added to the exhaust gases in the manifold reactor and by controlling the dividing ratio of said first and second stage secondary air according to the operational conditions of the engine such as the temperature thereof, accelerating condition, etc, in a manner that, in the cold starting up or accelerating condition, said first stage secondary air is limited to a proper and relatively small amount, thereby primarily burning a portion of the combustible components in the exhaust gases thereby raising the temperature of the exhaust gases and, thereafter, the remaining amount of the secondary air is introduced into the manifold reactor to be supplied to the exhaust gases residing therein at a temperature high enough to accept the remaining secondary air and accomplish complete combustion.

According to a particular feature based upon the aforementioned basic concept of the present invention, said second stage secondary air is established by bypassing a part of the secondary air which has conventionally been supplied as a whole to the air supply position corresponding to that of said first stage secondary air, said bypassed air being supplied to the manifold reactor. In this case, the amount of air bypassed as said second stage secondary air is, according to another advantageous feature of the present invention, determined to be larger as the temperature of the engine body or the reactor is lower. Furthermore, according to still another feature of the present invention, the amount of said second stage secondary air may be increased for a predetermined time after the start up of the engine. According to still another feature of the present invention, the amount of said second stage secondary air may be temporarily increased when the engine is accelerated.

In either case, according to the aforementioned features of the present invention, the amount of said second stage of secondary air is determined to be of a relatively high dividing ratio relative to the total amount of the secondary air when the temperature of the engine body or the reactor is at a low level during a predetermined period after the starting up of the engine or when the engine is being accelerated. However, the ratio may be zero when the temperature of the engine body or the reactor has reached a predetermined level, when a predetermined time has lapsed after the starting up of the engine, or when the engine is not in an accelerating condition. Therefore, the dividing ratio of said second stage secondary air to the total amount of the secondary air may be in the range from zero to a predetermined level. This, of course, means that in the normal operating condition of the engine after the warning up thereof, the entire amount of the secondary air may be added to the exhaust gases after they have been delivered from the exhaust ports and before they enter into the manifold reactor as in the conventional system.

According to a still further feature of the present invention, the total amount of the secondary air may be controlled according to operational conditions of the engine. In this case, said operational conditions should preferably be the rotational speed of the engine, the throttle opening, the vacuum in the suction pipe, etc., said conditions being processed in a computer.

In embodying the present invention, the means to control the dividing ratio of said first and second stage of secondary air may include a thermostat valve which bypasses a part of the secondary air delivered from a secondary air source to a second secondary air supply port opening to the inside of the manifold reactor, wherein the thermostat valve may be adapted to be closed when the temperature of the engine body or the manifold reactor has increased to a predetermined level.

Furthermore, said dividing ratio control means may include a differential pressure valve to control opening or closing of said bypass passage, said differential pressure valve being adapted to be opened according to an increase of the vacuum in the suction pipe.

Alternatively, said dividing ratio control means may include a time valve to open or close said bypass passage, said time valve being adapted to be opened for a predetermined period after the starting up of the engine.

The conduit means which supplies said second stage secondary air to said second secondary air supply port may preferably be heated by the exhaust gases in the manifold reactor, whereby preheated air is supplied as the second stage secondary air, thus promoting the perfect combustion of the combustible components in the manifold reactor.

BRIEF DESCRIPTION OF THE DRAWING

In the accompanying drawing,

FIG. 2 is a diagram showing an embodiment of the control system in the two stage secondary air supply system according to the present invention; and, FIGS. 3a, 3b and 3c are views showing several modifications of the structure of the second stage secondary air supply port.

DESCRIPTION OF THE PREFERRED EMBODIMENT

In the following, the present invention will be described in more detail with respect to the preferred embodiments and with particular reference to the accompanying drawings.

Figure 1:
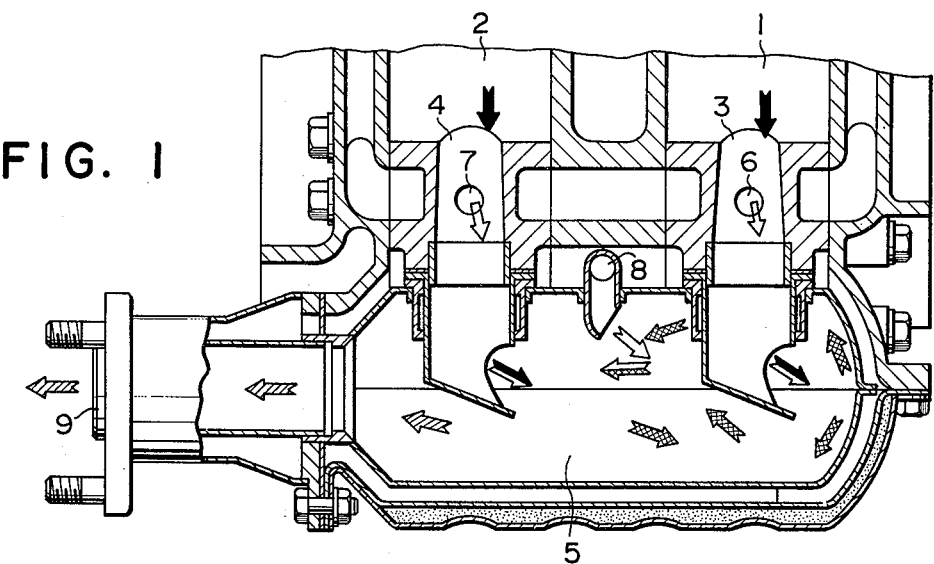
FIG. 1 is a sectional view showing an embodiment of a structure including exhaust ports of a rotary piston engine and a manifold reactor, wherein a two stage secondary air supply system is incorporated.

Referring first to FIG. 1 which shows an embodiment of the structure of a rotary piston engine at its exhaust port and a manifold reactor connected thereto wherein the first and second stage secondary air supply system according to the present invention is incorporated, the rotary piston engine comprises a 2-rotor type rotary piston engine having two rotors (not shown) adapted to rotate eccentrically in two rotor chambers 1 and 2. The exhaust gases delivered from said individual rotor chambers are delivered from exhaust ports 3 and 4 and introduced into a manifold reactor 5. In the exhaust gas passages leading from the exhaust ports 3 and 4 to the manifold reactor 5, there is provided first stage secondary air supply ports 6 and 7 which primarily supply the first stage secondary air to the exhaust gases delivered from the exhaust port 3 and 4. The exhaust gases which have been supplied with the first stage secondary air raise their temperature while they are flowing into the manifold reactor due to the combustion of a part of combustible components contained therein. The exhaust gases which have entered into the manifold reactor are further supplied with second stage secondary air from a second stage secondary air supply port 8, whereby the combustible components remaining in the exhaust gases are completely combusted, and the combustion gases are then exhausted into an exhaust gas pipe 9.

FIG. 2 is a diagram which shows an embodiment of a system for controlling the dividing ratio of said first and second stage secondary air. In FIG. 2, the portions corresponding to those shown in FIG. 1 are designated by the same reference numerals as in FIG. 1. In the shown system, the secondary air is cleaned by an air cleaner 10 and thereafter pumped up by a secondary air pump 11 to be delivered to an air control valve 12. From the air control valve, a main part of the air flow is delivered to the first stage secondary air supply ports 6 and 7 through a conduit 13. Bypass conduits 16 are branched from conduit 13 and extend through a first air dividing valve 14 and a second air dividing valve 15 in parallel to the second stage secondary air supply port 8. The air dividing valve 14 incorporates therein a temperature sensing element 17 made of a thermally expandable material and is so adapted that when the temperature sensing element 17 is in a low temperature condition, its valve body 18 is urged downward as seen in FIG. 2 by means of a compressing spring 19 thereby opening the bypass passage 16. When the temperature sensing element 17 expands due to a raise in its temperature according to the warming up of the engine body or the manifold reactor, the valve body 18 is pushed up as seen in FIG. 2 thereby intercepting the bypass passage 16.

The air dividing valve 15 has a diaphram chamber equipped with a diaphram 20 wherein one side of said diaphram is applied with atmospheric pressure by way of the air cleaner 10 while the other side of said diaphram is applied with the vacuum in the suction pipe 21. In the condition shown in FIG. 2, the vacuum in the suction pipe 21 is almost zero or very close to zero, and in this condition a spool type valve body 22 of the air dividing valve 15 is at the shown position where it opens the bypass passage 16. If a normal vacuum has been generated in the suction pipe 21 due to the operation of the engine, the diaphram 20 is curved rightward as seen in FIG. 2, whereby the spool 22 is moved rightward and intercepts the bypass passage 16. During the operation of the engine, however, if an acceleration of the engine is effected, the vacuum in the suction pipe 21 is temporarily reduced, whereby the spool 22 is moved leftward so far that the bypass 15 is temporarily opened according to the degree of acceleration, thus effecting a bypass of a part of the secondary air to the second stage secondary air supply port 8.

The total amount of the secondary air supplied through the conduit 13 is controlled by the air control valve 12 which in turn is controlled by a computer 23 in a conventional manner according to the vacuum in the suction pipe, rotational speed of the engine and throttle opening. The control of the air control valve 12 is effected in a manner such that the operation of its diaphram 24 is controlled by a throttle means 25 which is operated by the computer 23, said operation of the diaphram 24 selectively leaking a part of the air delivered from the air pump 11 into an air cooling jacket 27 of the manifold reactor 5 by way of a conduit 26. Element 28 is a relief mechanism of the air control valve, said mechanism, upon actuation, relieving air toward the air cleaner by way of a conduit 29.

Figure 3A:
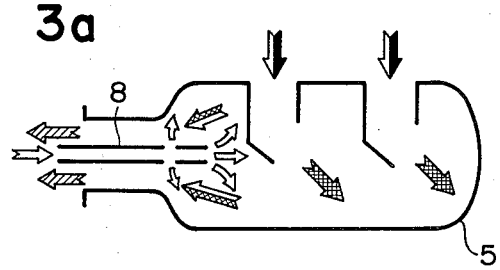
Figure 3B:
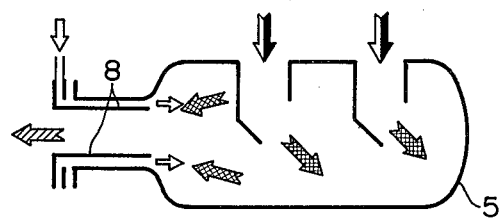
Figure 3C:
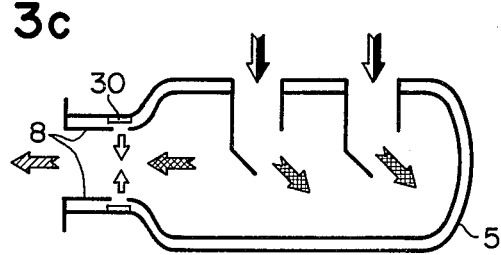

FIGS. 3a, 3b and 3c show several modifications of the structure for supplying the second stage secondary air into the manifold reactor. Either of these structures is adapted to preheat the second stage secondary air by the exhaust gases before it is ejected into the manifold reactor. Especially, in the structure shown in FIG. 3c, a stop ring 30 made of a thermally expandable material is provided adjacent the second stage secondary air supply port 8 in a manner such that the second stage secondary air supply port is automatically closed according to a rise of temperature of the manifold reactor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A system for purifying exhaust gases of an internal combustion engine by a manifold reactor with the injection of secondary air into the exhaust gases which comprises, providing a source of the secondary air, a first secondary air supply port which opens into the exhaust gas passage extending from an exhaust port of the engine to the manifold reactor, a second secondary air supply port which opens into the inside space of the manifold reactor, conduit means for transmitting secondary air from said source to said first and second secondary air supply ports, said conduit means including a main passage which leads to said first secondary air supply port and a branch passage which is branched from said main passage and leads to said second secondary air supply port, said branch passage including automatic control valve means for altering the ratio of the flow of air through said branch passage with respect to the total secondary air flow, according to at least one operating condition of the engine including the temperature thereof, said automatic control valve comprising a thermostat valve which is open when the temperature of the engine is low and is gradually closed as the temperature of the engine rises.

2. A system for purifying exhaust gases of an internal combustion engine by a manifold reactor with the injection of secondary air into the exhaust gases which comprises, providing a source of the secondary air, a first secondary air supply port which opens into the exhaust gas passage extending from an exhaust port of the engine to the manifold reactor, a second secondary air supply port which opens into the inside space of the manifold reactor, conduit means for transmitting secondary air from said source to said first and second secondary air supply ports, said conduit means including a main passage which leads to said first secondary air supply port and a branch passage which is branched from said main passage and leads to said second secondary air supply port, said branch passage including automatic control valve means for altering the ratio of the flow of air through said branch passage with respect to the total secondary air flow, according to at least one operating condition of the engine including the vacuum in a suction pipe of the engine, said automatic control valve comprising a diaphragm valve which is normally open and is gradually closed as a vacuum is generated in the suction pipe of the engine.

3. A system for purifying exhaust gases of an internal combustion engine by a manifold reactor with the injection of secondary air into the exhaust gases which comprises, providing a source of the secondary air, a first secondary air supply port which opens into the exhaust gas passage extending from an exhaust port of the engine to the manifold reactor, a second secondary air supply port which opens into the inside space of the manifold reactor, conduit means for transmitting secondary air from said source to said first and second secondary air supply ports, said conduit means including a main passage which leads to said first secondary air supply port and a branch passage which is branched from said main passage and leads to said second secondary air supply port, said branch passage including automatic control valve means for altering the ratio of the flow of air through said branch passage with respect to the total secondary air flow, according to at least one operating condition of the engine including vacuum in a suction pipe of the engine, said automatic control valve comprising a thermostat valve and a diaphragm valve, said thermostat valve being open when the temperature of the engine is low and is gradually closed as the temperature of the engine rises, and said diaphragm valve being normally open and is gradually closed as a vacuum is generated in the suction pipe of the engine.

* * * * *